United States Patent
Quint et al.

(10) Patent No.: US 11,249,059 B2
(45) Date of Patent: Feb. 15, 2022

(54) TECHNIQUES FOR CHECKING STATE OF ANALYZERS

(71) Applicant: Roche Diagnostics Operations, Inc., Indianapolis, IN (US)

(72) Inventors: Stefan Quint, Munich (DE); Benjamin Tiemann, Munich (DE); Florian Schweinberger, Munich (DE); Martin Stingl, Kochel (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 64 days.

(21) Appl. No.: 16/994,118

(22) Filed: Aug. 14, 2020

(65) Prior Publication Data

US 2021/0063361 A1 Mar. 4, 2021

(30) Foreign Application Priority Data

Aug. 27, 2019 (EP) .................................... 19193868

(51) Int. Cl.
*G01N 30/72* (2006.01)
*G01N 30/86* (2006.01)
(Continued)

(52) U.S. Cl.
CPC ..... *G01N 30/7266* (2013.01); *G01N 30/7233* (2013.01); *G01N 30/8631* (2013.01);
(Continued)

(58) Field of Classification Search
CPC ........... G01N 30/7266; G01N 30/8631; G01N 30/8658; G01N 30/7233; G01N 30/8637;
(Continued)

(56) References Cited

U.S. PATENT DOCUMENTS

| RE44,887 E * | 5/2014 | Whitehouse | ........ H01J 49/0018 250/288 |
| 2001/0001474 A1* | 5/2001 | Moon | ................. H01J 49/0018 239/3 |

(Continued)

FOREIGN PATENT DOCUMENTS

EP 3425369 A1 1/2019

OTHER PUBLICATIONS

European Search Report dated Feb. 12, 2020, in Application No. 19193868.7, 2 pp.
(Continued)

*Primary Examiner* — Kiet T Nguyen
(74) *Attorney, Agent, or Firm* — Roche Diagnostics Operations, Inc.

(57) ABSTRACT

An automated method of monitoring a state of an analyzer is provided including a mass spectrometer (MS) with an electrospray ionization (ESI) source coupled to a liquid chromatography (LC) stream, including monitoring an electrospray ionization current of the ESI source and identifying a condition of multiple conditions of the analyzer based on the monitored ionization current of the ESI source, one of the conditions being a presence of a dead volume in a liquid chromatography stream of the analyzer downstream of an LC column of the LC stream.

15 Claims, 8 Drawing Sheets

(51) Int. Cl.
*H01J 49/00* (2006.01)
*H01J 49/16* (2006.01)
*G01N 35/10* (2006.01)
*H01J 49/04* (2006.01)
G01N 30/62 (2006.01)
G01N 15/12 (2006.01)
G01N 30/04 (2006.01)

(52) U.S. Cl.
CPC ..... *G01N 30/8637* (2013.01); *G01N 30/8658* (2013.01); *G01N 30/8662* (2013.01); *G01N 30/8665* (2013.01); *G01N 35/1004* (2013.01); *H01J 49/0031* (2013.01); *H01J 49/0036* (2013.01); *H01J 49/0431* (2013.01); *H01J 49/0445* (2013.01); *H01J 49/165* (2013.01); *G01N 2015/1272* (2013.01); *G01N 2030/045* (2013.01); *G01N 2030/623* (2013.01)

(58) Field of Classification Search
CPC ........... G01N 30/8662; G01N 30/8665; G01N 35/1004; G01N 2015/1272; G01N 2030/045; G01N 2030/623; H01J 49/0031; H01J 49/0036; H01J 49/165; H01J 49/0431; H01J 49/0445
USPC ....................................................... 250/288
See application file for complete search history.

(56) References Cited

U.S. PATENT DOCUMENTS

2003/0155497 A1    8/2003   Kato
2008/0047330 A1*   2/2008   Whitehouse ........... B01D 59/44
                                                    73/61.48

OTHER PUBLICATIONS

Vollmer, Susanne et al., Peptide enrichment by microfluidic electrocapture for online analysis by electrospray mass spectrometry, Analytical Biochemistry, 2008, pp. 154-162, vol. 374.

* cited by examiner

FIG. 7

TECHNIQUES FOR CHECKING STATE OF ANALYZERS

CROSS-REFERENCE TO RELATED APPLICATIONS

This application claims priority to European Patent Application No. 19193868.7, filed 27 Aug. 2019, the disclosure of which is hereby incorporated by reference in its entirety.

FIELD OF THE DISCLOSURE

This disclosure relates to automated methods for monitoring a state of a mass spectrometer (MS) with an electrospray ionization (ESI) source of an automated analyzer.

BACKGROUND

Automated analyzers (e.g., in-vitro analyzers) are widespread in today's laboratory and hospital environments. These devices tend to become more and more complex due to added functionalities and increased throughput and a requirement to perform analytical tasks in an automated manner. As a consequence, errors and malfunctions can occur in a multitude of components which might lead to decreased productivity of the analyzer or less reliable measurement results. In some examples, external service personnel might be required to spot and fix an error which can take many hours or even days during which an analyzer or part of it might not be available.

SUMMARY

It is against the above background that the present disclosure provides certain unobvious advantages and advancements over the prior art. In particular, the inventors have recognized a need for improvements in calibration management of in-vitro diagnostic systems.

According to an embodiment of the present disclosure, an automated method of monitoring a state of an analyzer including a mass spectrometer (MS) with an electrospray ionization (ESI) source coupled to a liquid chromatography (LC) stream is provided, the method comprising: monitoring an electrospray ionization current of the ESI source; and identifying a condition of multiple conditions of the analyzer based on the monitored ionization current of the ESI source, wherein one of the conditions is a presence of a dead volume in a liquid chromatography stream of the analyzer downstream of an LC column of the LC stream.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present disclosure can be best understood when read in conjunction with the following drawings, where like structure is indicated with like reference numerals and in which:

FIG. 7 is a table summarizing how changes in different monitored parameters can be related to different conditions of the analyzer and responses in an example according to the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure.

DETAILED DESCRIPTION

In accordance with one first embodiment, the present disclosure relates to an automated method of monitoring a state of an analyzer including a mass spectrometer (MS) with an electrospray ionization (ESI) source coupled to a liquid chromatography (LC) stream. The method includes monitoring an electrospray ionization current of the ESI source and identifying a condition of multiple conditions of the analyzer based on the monitored ionization current of the ESI source. One of the conditions is a presence of a dead volume in a liquid chromatography stream of the analyzer downstream of an LC column of the LC stream.

In accordance with another second embodiment, an automated method of monitoring a state of an analyzer including a mass spectrometer (MS) with an electrospray ionization (ESI) source includes monitoring an electrospray ionization current of the ESI source and identifying of a condition of a component of the analyzer based on the monitored ionization current of the ESI source.

In accordance with yet another third embodiment, the present disclosure relates to a computer system being configured to carry out the steps of the technique of the first embodiment described above and herein.

Figure 3A:
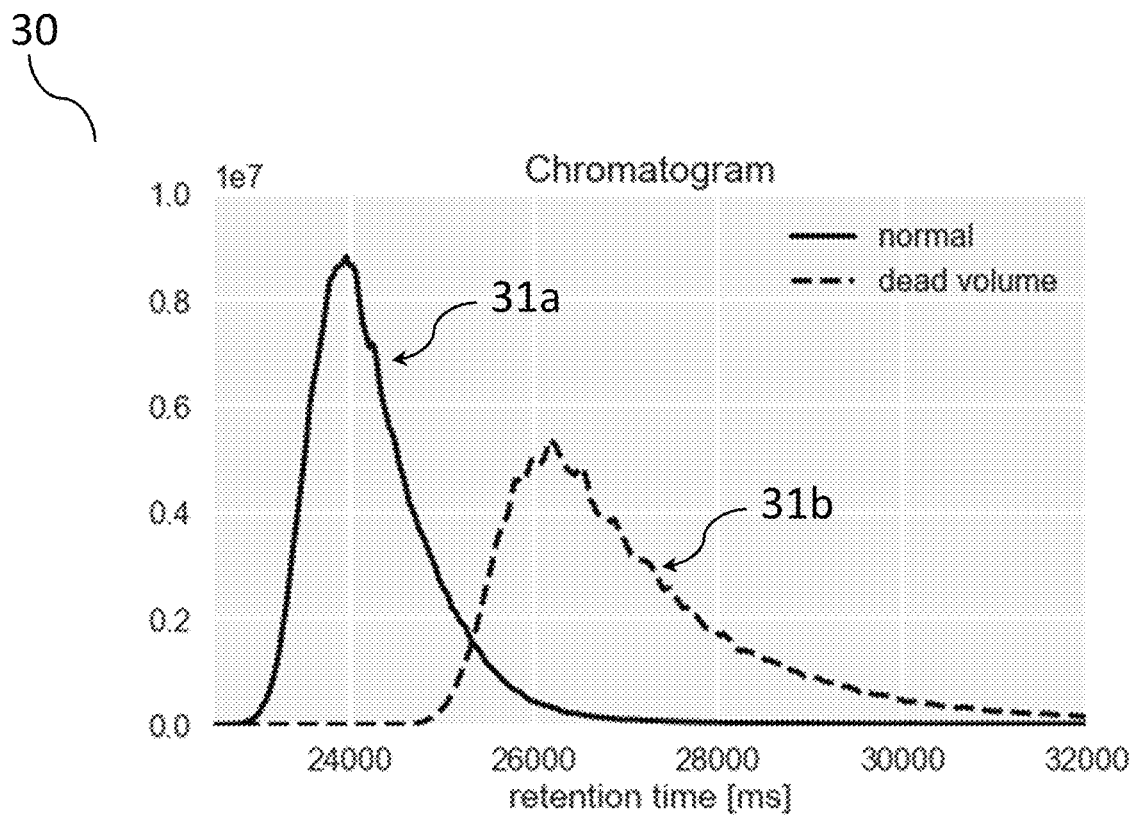
FIG. 3a shows example time series of a chromatogram in accordance with an embodiment of the present disclosure.
Figure 3B:
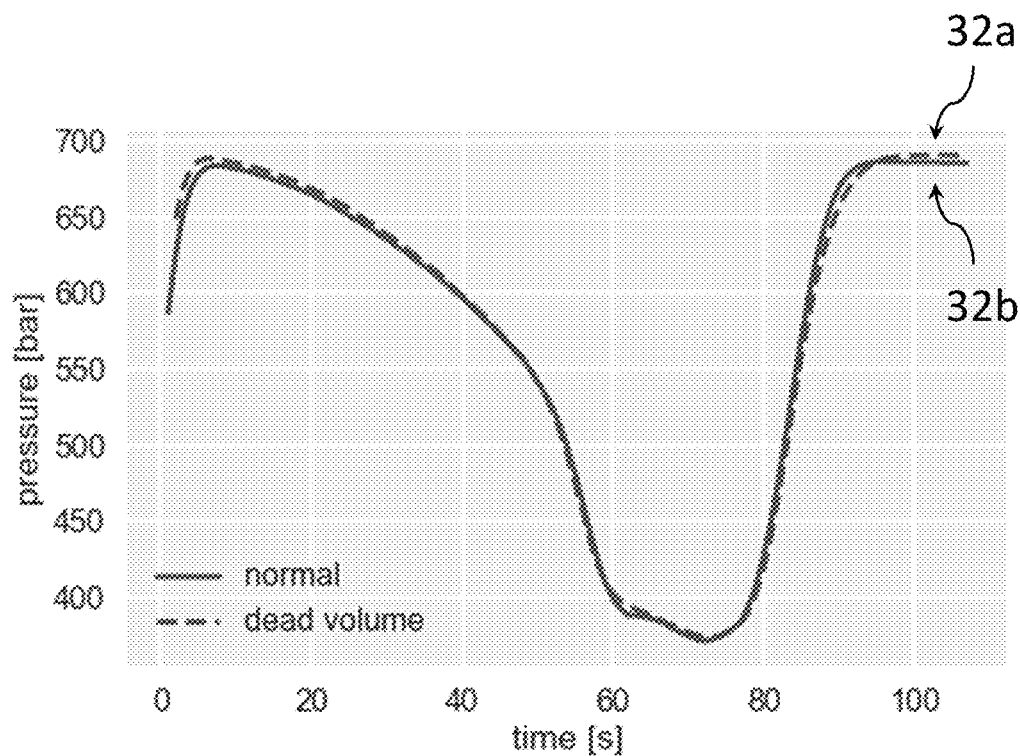
FIG. 3b shows example time series of a pressure in an LC stream in accordance with an embodiment of the present disclosure.

Although the embodiments of the present disclosure are not limited to specific advantages or functionality, it is noted that the technique of the first to third embodiments can have advantageous technical effects. Firstly, the monitoring technique of the first embodiment of the present disclosure can allow identifying dead volumes downstream of an LC column of the LC stream (also referred to as "post-column dead volume" in the present disclosure). Post-column dead volumes are errors which can be difficult to detect when considering other parameters of the LC stream. For instance, as shown in FIG. 3b, monitoring a pressure of the LC stream might not be helpful as post-column dead volumes might have little or no effect on the pressure curve. Moreover, as can be seen in FIG. 3a, chromatographic features (e.g., a retention time, a peak width or a peak height) change due to post-column dead volume. However, similar changes in the chromatographic features can also be caused by different other conditions than the presence of a post-column dead volume. For instance, column aging can cause changes in the chromatographic features as shown in FIG. 3a. Therefore, the technique of the present disclosure taking into account an electrospray ionization current of the ESI source (also referred to as ESI current in the present disclosure) allows for a more precise identification of a condition of the analyzer.

Secondly, the exact identification of a post-column dead volume can be helpful to render any checking or maintenance operation more effective. Instead of going through a plethora of error sources, an operator or another service person can swiftly check or act on the determined condition. Moreover, the exact identification of a post-column dead volume can allow less experienced personnel to perform checking or maintenance operations. A downtime of the analyzer (or a module thereof) can be reduced as a result of this in some situations. For instance, it might be not necessary to bring in external service personnel in some examples.

Thirdly, the monitoring techniques of the present disclosure can be employed to distinguish between different conditions of the analyzer and trigger particular responses. In this manner, the detecting and/or monitoring technique can facilitate employing resources (e.g., operator time or external service personnel) more efficiently by allowing a more precise allocation of these resources due to an improved knowledge of the state of the analyzer.

Fourthly, the monitoring techniques can be seamlessly integrated into existing analyzer workflows in some examples. For instance, the monitoring technique can be carried out as part of an analyzer initialization workflow. It might be necessary to add an ESI current detection device to the ESI source to monitor the ESI current. However, this might have no influence on a performance (e.g., throughput) of the analyzer and can be done using well-known and relatively inexpensive components in some examples.

Several terms are used as having a particular meaning in the present disclosure.

The term "dead volume" in the present disclosure refers to an extra volume experienced by solutes as they pass through the LC stream, in particular any unswept volume exposed to a mobile phase flow.

The term "condition" refers to any particular state of the analyzer or parts thereof (e.g., an LC column or an ESI source or one of their sub-components). A condition can be an error or defect of the analyzer or parts thereof (e.g., an LC column or an ESI source or one of their sub-components). However, the term "condition" according to the present disclosure also includes conditions which are acceptable (e.g., a condition which allows operation within specification, also called "normal operation" herein) or still acceptable (e.g., an aging condition of a component of the analyzer which brings the component closer to an unacceptable range). Moreover, it might not be possible to unambiguously distinguish between a "normal operation" or an error in some situations.

A "time series" according to the present disclosure refers to at least two of a particular parameter values (e.g., of the ionization current of the ESI source) at two different points in time (e.g., at least one earlier point in time and at least one later point in time). A time series can include (much) more than two values at respective points in time in some examples. The term "point in time" shall not limit a measurement window for obtaining a measurement value included in the time series to a particular accuracy. For instance, an averaged measurement value obtained by averaging over multiple measurements of a parameter can also be included in the time series according to the present disclosure. A time series can include values at equidistant points in time or at non-equidistant points in time. The term "time series" is used in the present disclosure as referring both to "raw data" (e.g., as retrieved from a current sensor) as well as processed raw data (e.g., by using signal processing techniques) as long as the processing step still reflects the time-dependence of the monitored parameter (e.g., an ionization current of the ESI source).

The terms "automated" or "automatically" according to the present disclosure refers to operations carried out by a machine without user interaction. The automated steps can be part of a method including also steps requiring user interaction. For instance, a user might schedule or trigger the automated steps of the techniques of the present disclosure.

An "analyzer" according to the present disclosure is an apparatus dedicated to perform an analytical function. In some examples, the analyzers can be configured to carry out to the analysis of samples (e.g., samples for in vitro diagnostics). For example, an analyzer can be a clinical diagnostics system for performing vitro diagnostics. The analyzers of the present disclosure include at least one liquid chromatography (LC) stream connected to a mass spectrometer (MS) with an electrospray ionization source.

The analyzers of the present disclosure can have different configurations according to the need and/or according to a desired workflow. Additional configurations may be obtained by coupling a plurality of apparatuses and/or modules together. A "module" is a work cell, typically smaller in size than the entire analyzer, which has a dedicated function. This function can be analytical but can be also pre-analytical or post-analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical devices, designed to execute respective workflows that are optimized for certain types of analysis.

The analyzer can include analytical apparatuses for one or more of clinical chemistry, immunochemistry, coagulation, hematology, etc.

Thus, the analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The analyzer can comprise functional units such as liquid handling units for pipetting and/or pumping and/or mixing of samples and/or reagents and/or system fluids, and also functional units for sorting, storing, transporting, identifying, separating, and detecting.

The term "sample" refers to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest.

The term "sample" is tendentially used to indicate either a sample before sample preparation or a sample after sample preparation or both. For instance, the term "sample" can refer to a sample before injection into an LC stream and to a sample after injection into the LC stream in a mobile phase.

Examples of analytes of interest are vitamin D, drugs of abuse, therapeutic drugs, hormones, and metabolites in general. The list is however not exhaustive.

In particular, the analyzer can comprise a sample preparation station for the automated preparation of samples. A "sample preparation station" is a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner: pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing, etc.).

A sample may be provided for example in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

Unless specified differently in the respective context, the terms "about" in connection with values for parameters means to include a deviation of +/−10% from the specified value in the present disclosure.

In order that the embodiments of the present disclosure may be more readily understood, reference is made to the following examples, which are intended to illustrate the disclosure, but not limit the scope thereof.

First, an overview over the monitoring techniques of the present disclosure will be given in connection with FIG. 1 to FIG. 4. Subsequently, aspects of the analyzers and particularly the ESI sources for which the monitoring techniques of the present disclosure can be used will be discussed in connection with FIG. 5a to FIG. 5b. Additional aspects and concrete examples of the monitoring techniques of the present disclosure will be discussed in connection with FIG. 6 and FIG. 7.

General Overview

Figure 1:
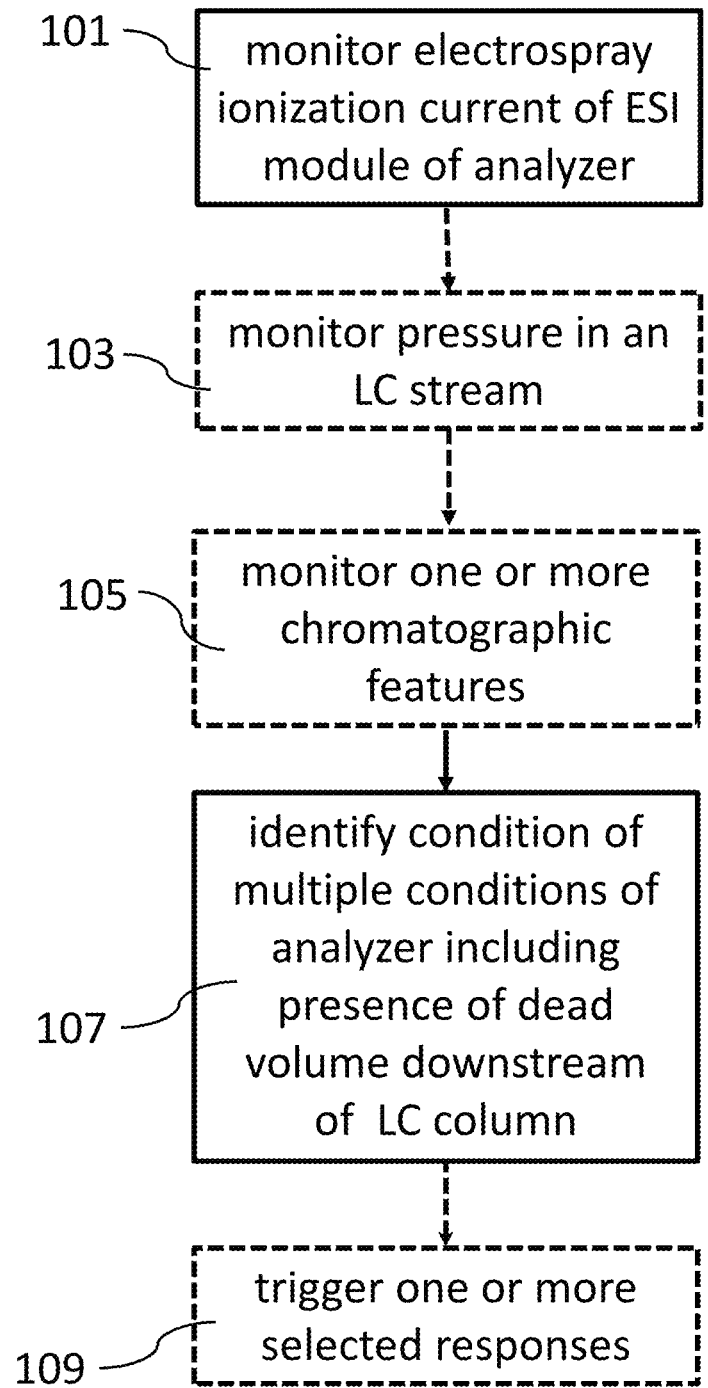
FIG. 1 is a flow diagram of the monitoring technique of an embodiment of the present disclosure.

FIG. 1 is a flow diagram of the monitoring technique of the present disclosure.

The automated method of monitoring a state of an analyzer includes monitoring 101 an electrospray ionization current of the ESI source and identifying 107 a condition of multiple conditions of the analyzer based on the monitored ionization current of the ESI source. One of the conditions is a presence of a dead volume in a liquid chromatography stream of the analyzer downstream of an LC column of the LC stream.

These steps will be discussed in more detail in the subsequent sections.

The step of monitoring the ESI current can include using any suitable sensor to generate a time series of ESI current values. For instance, a current measurement device can be connected to the ESI source to measure an ESI current of the ESI source.

In some examples, the ESI current is sampled with a minimum sampling frequency of more than 1 Hz (e.g., more than 5 Hz or more than 10 Hz). A sampling rate with this minimum sampling frequency can secure that certain changes are reflected in the time series which allow identifying the multiple conditions.

Figure 4:
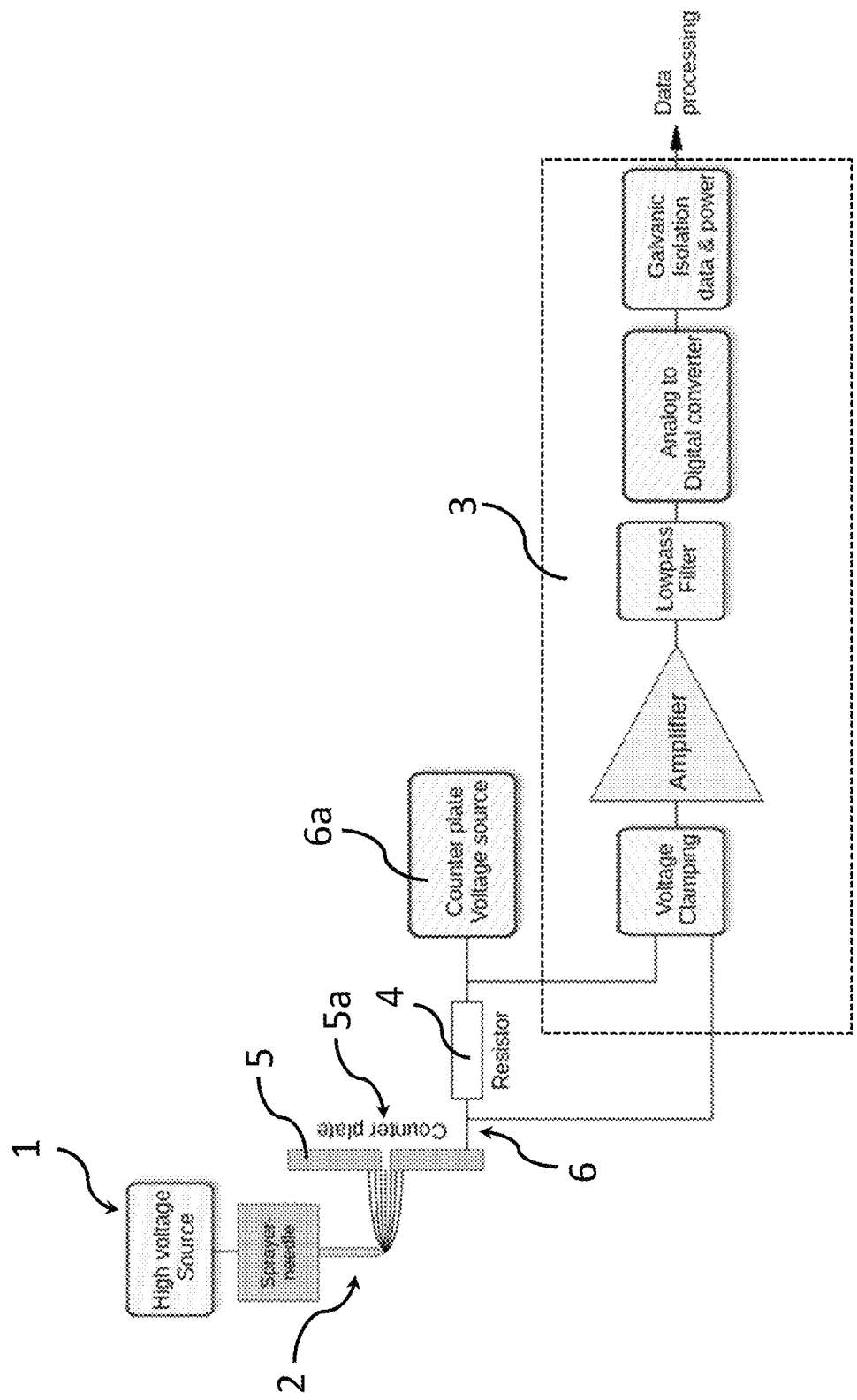
FIG. 4 is a schematic depiction of a current measurement device of an ESI source.

FIG. 4 is a schematic depiction of a current measurement device of an ESI source. The ESI source includes two electrodes 2, 5 to apply a high voltage (e.g., by means of a high voltage source 1 coupled to the first electrode 2) so that the ESI source can produce ions for input into a mass spectrometer (further details regarding possible configurations of the ESI source will be discussed below in connection with FIG. 5b).

In the example of FIG. 4, the first electrode 2 is included in an ESI source which can nebulize a mobile phase being transported to the ESI source from an LC column. The second electrode 5 is arranged adjacent to a sampling device 5a (e.g., a sampling capillary), which is configured to collect the ions produced in the ESI source (e.g., as a counter plate as depicted in FIG. 4).

Now, during operation of the ESI source a current flows between the electrodes 2, 5 as nebulized sample is continuously ionized (depending on the sign of the applied voltage negatively or positively charged ions are produced and the ESI current flows in one direction or in an opposite direction). This ESI current can be detected by a current measurement device 3 of the ESI source. In the example of FIG. 4, the current measurement device is coupled to a resistive element 4 inserted in a conductor coupling the second electrode 5 and a second voltage source 6a. For instance, two terminals of the current measurement device are electrically connected to two respective terminals of the resistive element 4 (e.g., to detect a voltage drop over the restive element 4 indicative of the ESI current).

In the example of FIG. 4, the current measurement device 3 include a voltage clamping circuit and circuitry to process a detected signal (e.g., an amplifier and a low pass filter to pre-process the signal and an analog digital converter ("ADC") circuit to convert the signal into the digital realm).

The configuration in FIG. 4 is only exemplary. In other examples, the ESI current can be detected in different ways and with different devices. For example, a current measurement device can be coupled to different parts of an ESI source. In addition, any parameter indicative of the ESI current can be measured (e.g., as shown in FIG. 4 a voltage drop over a resistive element). In that respect, the ESI current can be detected directly or indirectly.

Moreover, the expression "monitored ionization current" used in the present disclosure does not mean that the monitoring involves quantifying a current value (e.g., in the unit Ampere). While this might happen in some examples, in other examples a parameter indicative of the ESI current (e.g., a voltage proportional to the ESI current) can be detected. It is only required that the monitored parameter carries information regarding the ESI current. In the subsequent passages, the monitored ionization current of the ESI source is measured as a time series of current values for the sake of illustration.

In some examples, the time series carrying information regarding the ESI can undergo one or more signal processing steps. For instance, a single time series of system pressures can be smoothed or aberrant values can be removed. In addition or alternatively, multiple time series (e.g., each spanning at least part of a single injection process) can be averaged. The averaged time series can then be further processed. In still further examples, one or more portions of the times series can be removed.

The time series of the monitored ionization current can span a particular part of an injection process of a sample into a LC column and/or an LC gradient having a particular pressure characteristic following the sample injection process. In some cases, the time series of the monitored ionization current can span substantially the complete LC gradient (e.g., more than 90% of a duration of an LC gradient). In other examples, the monitored ionization current can span a particular portion of the LC gradient and/or the injection process (e.g., a window covering 20% or less or 10% or less of a duration of the LC gradient).

Figure 2:
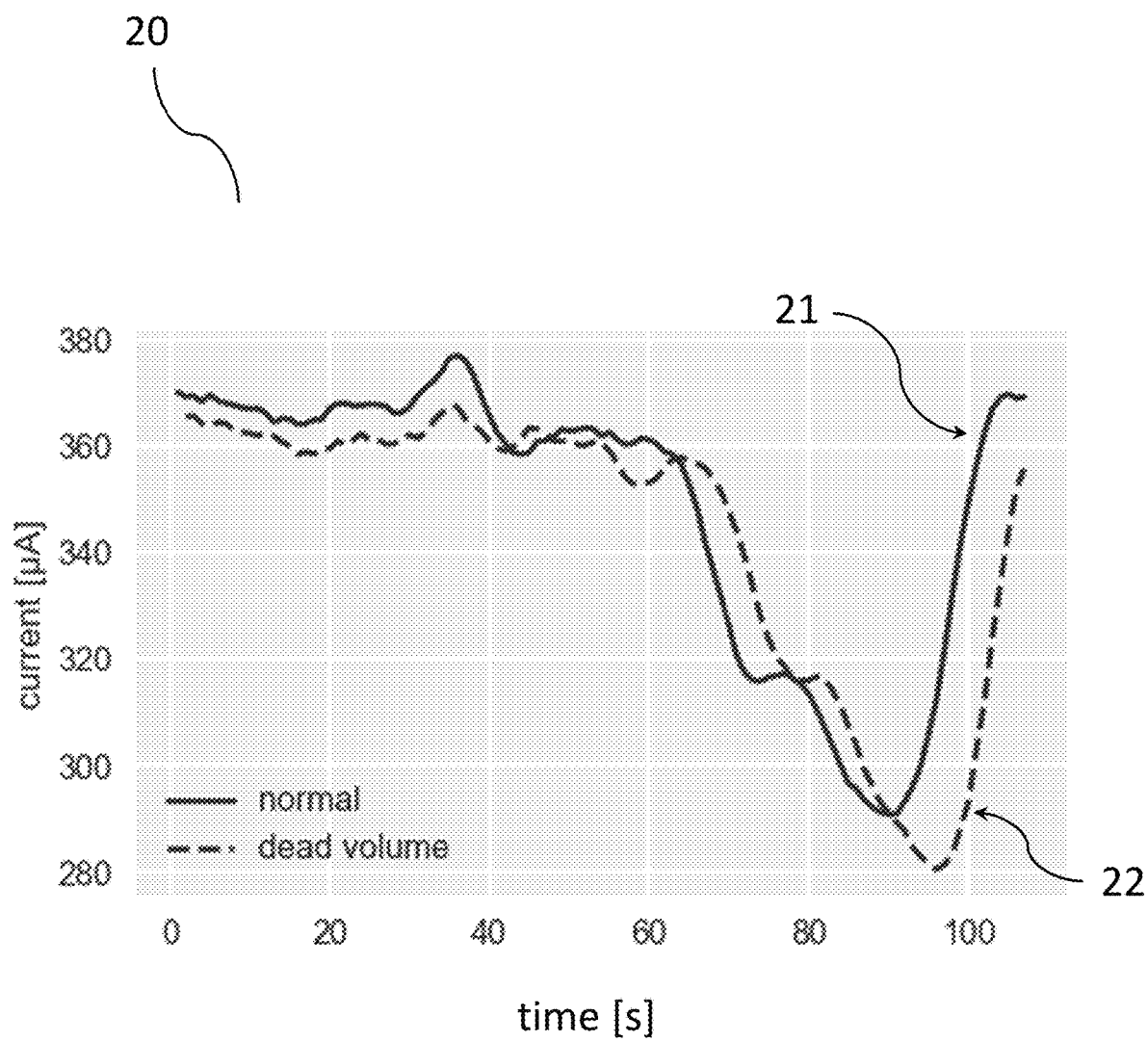
FIG. 2 illustrates example time series of the electrospray ionization current of the ESI source which can be monitored according to an embodiment of the present disclosure.

FIG. 2 illustrates example time series 20 of the electrospray ionization current of the ESI source, which can be monitored according to the present disclosure. As can be seen, a first time series 21, which is monitored during normal operation, and a second time series 22, which is recorded when a dead volume downstream of an LC column is present, have visibly different characteristics. These differences can be used to identify the presence of a dead volume downstream of the LC column.

In some examples, the identification of the presence of a dead volume downstream of the LC column includes assessing a change in the time series compared to a previously monitored time series or compared to a reference time series. In addition or alternatively, identification of the presence of a dead volume downstream of the LC column includes assessing a global or local feature of the times series.

Assessing a change in the time series compared to a previously monitored time series or compared to a reference time series can include determining one or more of a decrease in an ESI current, an increase in the ESI current, a fluctuation in the ESI current, a profile shift in a time series of the ESI current (i.e., the profile of the time series remains substantially unchanged but moves in time relative to a reference point in time) and a profile change of a time series of the ESI current (e.g., the times series starts or stops to show an oscillating behavior or shows a different change in the profile of the time series). The determination can be a binary or qualitative evaluation of a change in the time series (e.g., "has decreased") or a quantitative (e.g., "has decreased by XXX").

Assessing a global or local feature of the times series can include one or more of a magnitude of a signal drop or rise, a speed of a signal drop or rise, a signal value at a particular point, a local or global minimum or maximum, or a spectral feature (e.g., an energy content in a particular frequency band).

In some examples, identifying a presence of a dead volume in a liquid chromatography stream based on the monitored ionization current of the ESI source includes assessing a profile shift in a time series of the monitored ionization current of the ESI source. In this case, the presence of a dead volume in a liquid chromatography stream can be identified if the time shift in a time series of the monitored ionization current of the ESI source (compared to a reference time series) is above a certain predetermined threshold time shift (e.g., more than 5 seconds or more than 10 seconds). As shown in FIG. 2, a time shift in the time series of the monitored ionization current can be a suitable characteristic to identify a dead volume downstream of an LC column. As can be seen, the first time series 21 and the second time series 22 have a relatively similar shape or profile but are shifted in time by a certain amount. However, even though a time shift of the time series can be a particular suitable characteristic to identify a dead volume downstream of an LC column, other characteristics of the ESI current can be used alternatively or in addition in other examples.

In some examples, identifying a presence of a dead volume in a liquid chromatography stream of the analyzer downstream of an LC column of the LC stream includes determining if a waveform of the electrospray ionization current has a phase shift compared to a reference waveform.

A profile shift of a time series (or any other change in a time series discussed herein) can be determined by comparing the monitored time series to a reference time series. A reference time series can be static (e.g., a time series recorded after a setup of the analyzer or a maintenance operation) or can be dynamically updated during operation of the analyzer (e.g., the reference time series can be a time series monitored at an earlier point in time than a current time series during operation of the analyzer).

In other examples, evaluating an ESI current (or any other monitored parameter discussed in the present disclosure) can include comparing single measurement values for the respective parameter (e.g., a measurement value at a particular reference point in time). For instance, it can be evaluated if the ESI current or other parameter decreases, increases, or remains constant at a particular reference point in time.

In the monitoring techniques of the present disclosure additional further parameters can be monitored in addition to the ESI current. This will be discussed next.

Further Monitored Parameters

In some examples, the monitoring techniques of the present disclosure further comprise monitoring one or more additional parameters including a pressure in a liquid chromatography (LC) stream of the analyzer: The identification of a condition of the analyzer is further based on the monitored pressure in the LC stream to distinguish the multiple conditions.

For example, the monitoring techniques of the present disclosure further comprise monitoring one or more additional parameters including one or more chromatographic features of a chromatogram of a liquid chromatography (LC) stream of the analyzer. In these situations, the identification of a condition is further based on the monitored chromatographic features to distinguish the multiple conditions.

The chromatographic feature can be selected from the list consisting of a peak width parameter (e.g., a FWHM peak width or a 1/e peak width), a retention time parameter, a peak height parameter, a peak area parameter and a peak symmetry parameter.

In the process of identification of a condition of the analyzer, the further parameters can be processed in the same manner as the ESI current discussed above. For example, relative changes can be assessed as discussed above.

In some examples, a time series is monitored for multiple (e.g., each) additional parameter. The identification of the condition can include assessing a change in the time series compared to a previously monitored time series or compared to a reference time series. In addition or alternatively, the identification of the condition can include assessing a global or local feature of the times series.

The additional monitored parameters can be measured on an internal standard or another sample with known composition. However, in other examples the additional monitored parameters can also be measured on a sample with unknown composition (e.g., a patient sample).

In one example, the identification of the condition is based at least on the monitored ESI current, a monitored pressure, and two or more chromatographic features (e.g., a retention time, a peak height and a peak width). A concrete example of a set of parameters will be discussed in connection with FIG. 7 below.

FIG. 3a shows two example time series of a chromatogram. A first time series 31a is a chromatogram (e.g., of a substance of an internal standard) when the analyzer operates normally (within specification). A second time series 31b is a chromatogram (e.g., of the same substance as the first time series 31a of an internal standard) when a dead volume downstream of the LC column is present. It can be seen that different chromatographic features (e.g., peak height and peak width) are different between the first and second time series 31a, 31b when a post-column dead volume is present. Therefore, chromatographic features can be used in addition to the ESI current to identify a post-column dead volume. However, as discussed above, the change between the first and second time series 31a, 31b can also have other causes, so they might not be sufficient alone to unambiguously identify a post-column dead volume.

FIG. 3b shows two example time series of pressure during an injection process and an LC gradient. A first time series 32a is taken when the analyzer operates normally (within specification). A second time series 32b is a taken when a dead volume downstream of the LC column is present. As also discussed above, the pressure time series are substantially unchanged when a post-column dead volume is present. However, the pressure time series can be used to identify other conditions of the analyzer, as will be discussed below.

Analyzer Hardware

In the subsequent sections additional aspects of the analyzers including a mass spectrometer (MS) with an electrospray ionization source coupled to a liquid chromatography (LC) stream in which the monitoring techniques of the present disclosure can be employed will be discussed in connection with FIG. 5a and FIG. 5b.

Figure 5A:
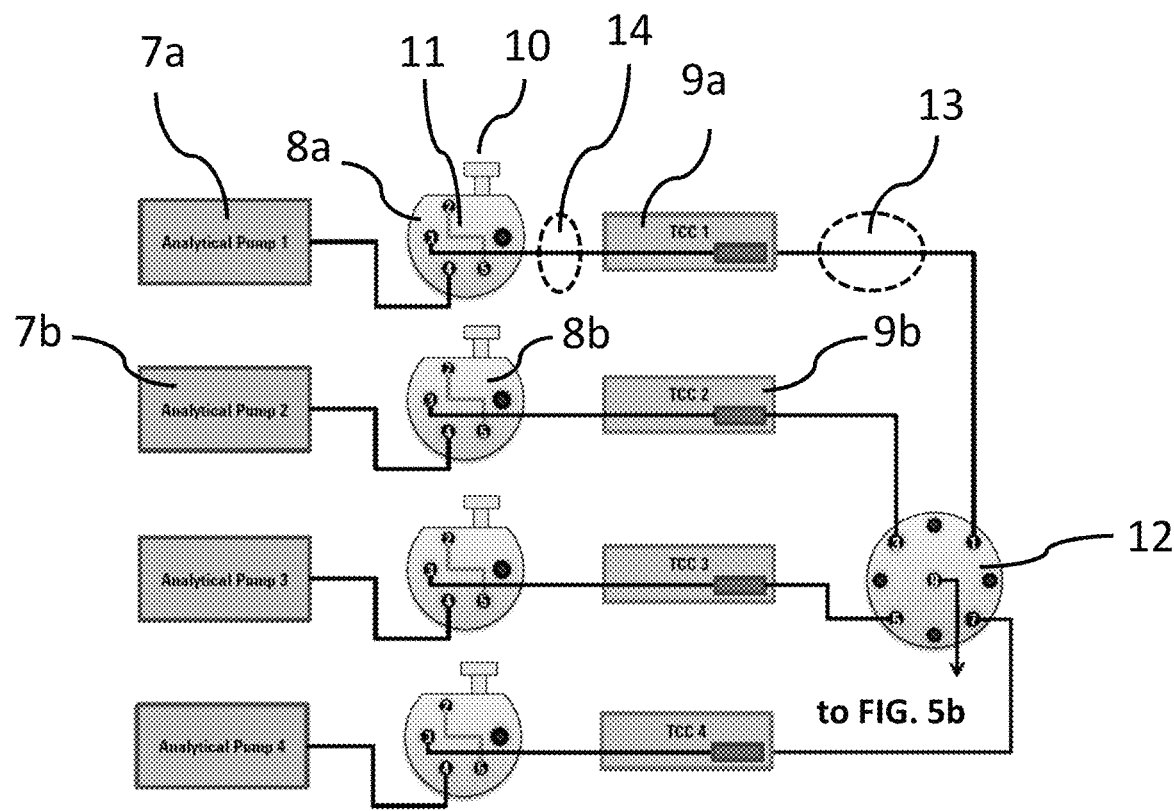
FIG. 5a illustrates an example system including multiple LC streams coupled to an ESI source.
Figure 5B:
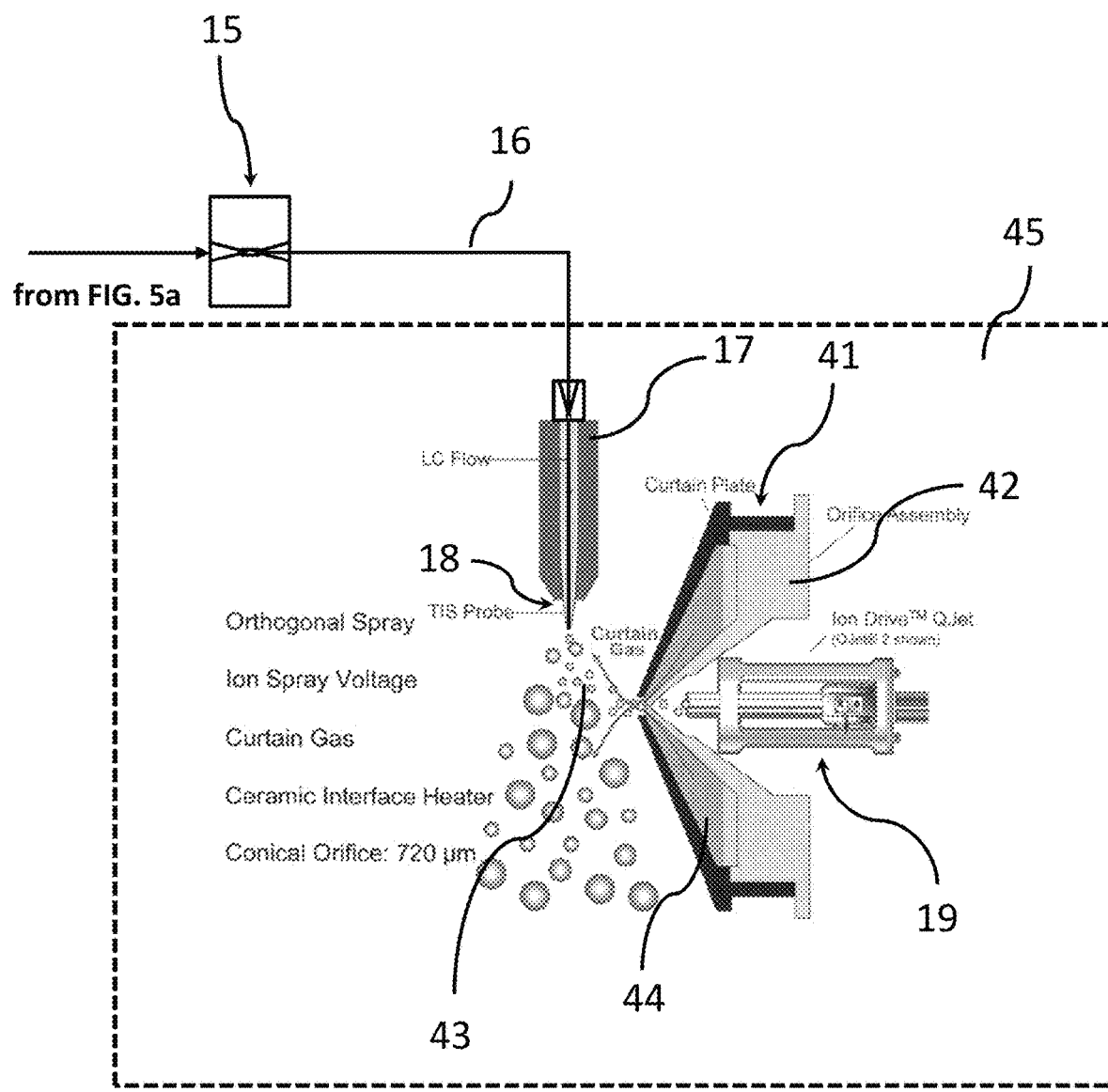
FIG. 5b illustrates an example system including an ESI source with an orthogonal arrangement of a nebulizer and a sampling capillary.

FIG. 5a and FIG. 5b illustrate an example system including multiple LC streams (FIG. 5a) coupled to an ESI source with an orthogonal arrangement of a nebulizer and a sampling capillary (FIG. 5b).

In the example of FIG. 5a, each LC stream includes a loading pump 7a, 7b, an injection assembly 8a, 8b including a rotary valve, and an LC column 9a, 9b. The multiple LC streams are connected to s stream selection valve 12, which can connect each of the streams to the ESI source (and the mass spectrometer) as depicted in FIG. 5b.

In operation, the loading pump 7a, 7b provides a mobile phase (e.g., a mixture of aqueous and an organic liquids) to the respective injection assembly 8a, 8b. The injection assembly 8a, 8b include an injection port 10 for injecting a sample into the LC stream and a sample loop 11 for receiving the injected sample. The components of the LC stream can be connected by capillaries or other fluid connectors.

Now, as depicted in FIG. 5a, different dead volumes can occur in the fluid path of the LC streams. For instance, FIG. 5a illustrates a possible position upstream of the LC column 9a where a pre-column dead volume 14 can occur and a possible position of a post-column dead volume 13 downstream of the LC column 7a (the position can change over time during operation of the LC stream).

The monitoring technique of the present disclosure can be used to detect a condition (e.g., a post-column dead volume) in each of multiple LC streams of an analyzer having multiple streams in some examples.

FIG. 5a shows only an example of a configuration of LC streams of an analyzer in which the monitoring techniques of the present disclosure can be employed. In some examples, the analyzer has additional LC streams. Moreover, the injection assemblies 8a, 8b can be arranged differently than shown in FIG. 5a.

The fluid path of the analyzer continues downstream of the stream selection valve by a capillary 16 connecting the stream selection valve 12 and an ESI source 45 as shown in FIG. 5b.

FIG. 5b depicts an ESI source 45 with an orthogonal arrangement of a nebulizer and a sampling capillary. In this example, the LC flow exiting one of the LC columns is guided through an ESI probe 17 including a sprayer needle 18. In this manner, the LC flow is nebulized in a volume downstream of the sprayer needle 18 where ionization takes place and the ionized substance transforms into a gaseous phase (as also discussed above). A sampling device 19 (e.g., a sampling capillary) is provided to collect the ions in the gaseous phase 43. In the example of FIG. 5b, the ESI probe 17 and the sampling device 19 are arranged orthogonally. In other examples, an ESI probe and a sampling device can be arranged co-axially.

The ESI source 45 further includes an assembly 42 to provide a curtain gas (e.g., $N_2$), which reduces the entry of background ions (e.g., solvent clusters) into the MS. The assembly can have a curtain plate 41 and an orifice assembly 42 for providing the curtain gas.

As discussed above, a high voltage is applied, e.g., between the sprayer needle 18 and the curtain plate 41. The ESI current flowing between these elements can be monitored (e.g., by the devices discussed above) and used in the identification process of a state of the analyzer.

Other ESI sources' ESI current can also be monitored with the appropriate hardware.

Conditions and Responses

In the subsequent sections different additional conditions of the analyzer which can be identified (in addition to the presence of a post-column dead volume) using the techniques of the present disclosure will be discussed.

In general, the conditions can include one or more of an aging of a particular component of the analyzer or an error or defect of a particular component of the analyzer. The components can be selected from the list including an LC column, an LC column heater, a valve included in a flow path of an LC stream or one of its parts (e.g., a sample loop), and an ESI source or one of its parts (e.g., an ion source or a sprayer needle). In other examples, the components can be one of the components described in connection with FIG. 5a or FIG. 5b.

For instance, the multiple conditions can include one or more of a presence of a pre-column dead volume, a valve error, a sprayer needle aging, a column defect, a column aging, a column heater defect, and an instable spray condition.

The error can be caused by a contamination of a component of the analyzer (e.g., the components described in connection with FIG. 5a or FIG. 5b). For instance, the condition can relate to an ion source contamination or a contamination of a sprayer needle of an ESI source.

In other examples, the condition can be a clogging or a leakage in a fluid path of an LC stream. The condition can include a clogging or leakage in a particular part of the path of an LC stream in some examples. Further example conditions that can be identified using the monitoring techniques of the present disclosure will be discussed below.

The monitoring techniques of the present disclosure include triggering one or more selected responses of multiple responses depending on the determined condition of the analyzer. In general, the triggered response can include informing an operator or a third person regarding the identified condition. In addition or alternatively, the triggered response can include triggering measures to address an error or defect.

For instance, the multiple responses include a response including logging the determined condition of the analyzer (e.g., in a log of the analyzer or a central log of a laboratory or other unit the analyzer is employed in). In addition or alternatively, the responses can include setting a flag indicating that a particular condition of the multiple conditions has been identified.

In addition or alternatively, the multiple responses include generating an error message. For instance, an error message can be displayed on a graphical user interface of the analyzer. In addition or alternatively, an error message can be sent to a remote site (e.g., a site of an external service provider).

In addition or alternatively, the multiple responses include a response including starting or scheduling an automatic maintenance operation.

In addition or alternatively, the multiple responses include asking an operator to perform a predetermined check or maintenance operation. For example, the response can include asking the operator to confirm that a particular error has occurred. In other examples, the response can include asking an operator to resolve a particular error of the analyzer. In some examples, an operator or third person is provided with instructions regarding how to perform a respective check or maintenance operation (e.g., in form of a check list and/or a tutorial).

In addition or alternatively, the multiple responses include scheduling a preventive maintenance operation. For instance, the identified condition (or a trend in the identified condition) can be evaluated to determine a point in time at which there might be a more consequential error in the analyzer. Based on this information, the techniques of the present disclosure can include scheduling a corresponding maintenance operation (e.g., by informing an external service provider) prior to the determined point in time.

The check or maintenance operation can include cleaning, reconfiguring or replacing a component of the analyzer (e.g., the components discussed above or described in connection with FIG. 5a or FIG. 5b). For example, the check or maintenance operation can be one of reconnecting a capillary of the ESI source, replacing a column of an LC stream of the analyzer, cleaning an ion source of the ESI source and cleaning or replacing a capillary of the ESI source or cleaning or replacing a sprayer needle of an ESI source.

As discussed above, determining a condition of the analyzer can include identifying an error of the analyzer, optionally one error of multiple predetermined errors.

In some examples, an error of multiple potential errors is identified based determining if the electrospray ionization current of the ESI source and optionally one or more additional measured parameters of the analyzer are within or outside an acceptance range.

For instance, the error can be an error in a capillary leading to a sprayer needle of the ESI source (e.g., an error can include a leakage in the capillary). In addition and alternatively, an error can be an instable spray of a sprayer needle of the ESI source. In addition and alternatively, an error can be an error that is caused by a column aging of an LC column. In addition and alternatively, an error can be an error that is caused by an aging of an ESI sprayer of the ESI source.

The evaluation of the electrospray ionization current and optionally one or more additional measured parameters of the analyzer can involve any suitable numerical technique to identify the multiple conditions of the analyzer.

In some examples, determining a condition of the analyzer based on the electrospray ionization current and optionally one or more additional measured parameters of the analyzer includes using a classifier identifying one of multiple classes corresponding to the multiple conditions. The classifier can be a classifier trained by a machine learning algorithm (e.g., an artificial neural network).

In some examples, the monitoring technique of the present disclosure can include predicting a development of the electrospray ionization current and optionally one or more additional measured parameters over time based on the monitored electrospray ionization current and optionally one or more additional measured parameters. The method can further comprise triggering a response based on the predicted development of the electrospray ionization current and optionally one or more additional measured parameters. For instance, a prediction of the ESI current can yield that the ESI current increases (e.g., with a particular constant or non-constant rate). The monitoring technique of the present disclosure can compare a monitored parameter at a certain point in time with a predicted value for the respective parameter as part of the identification of the condition of the analyzer.

Figure 6:
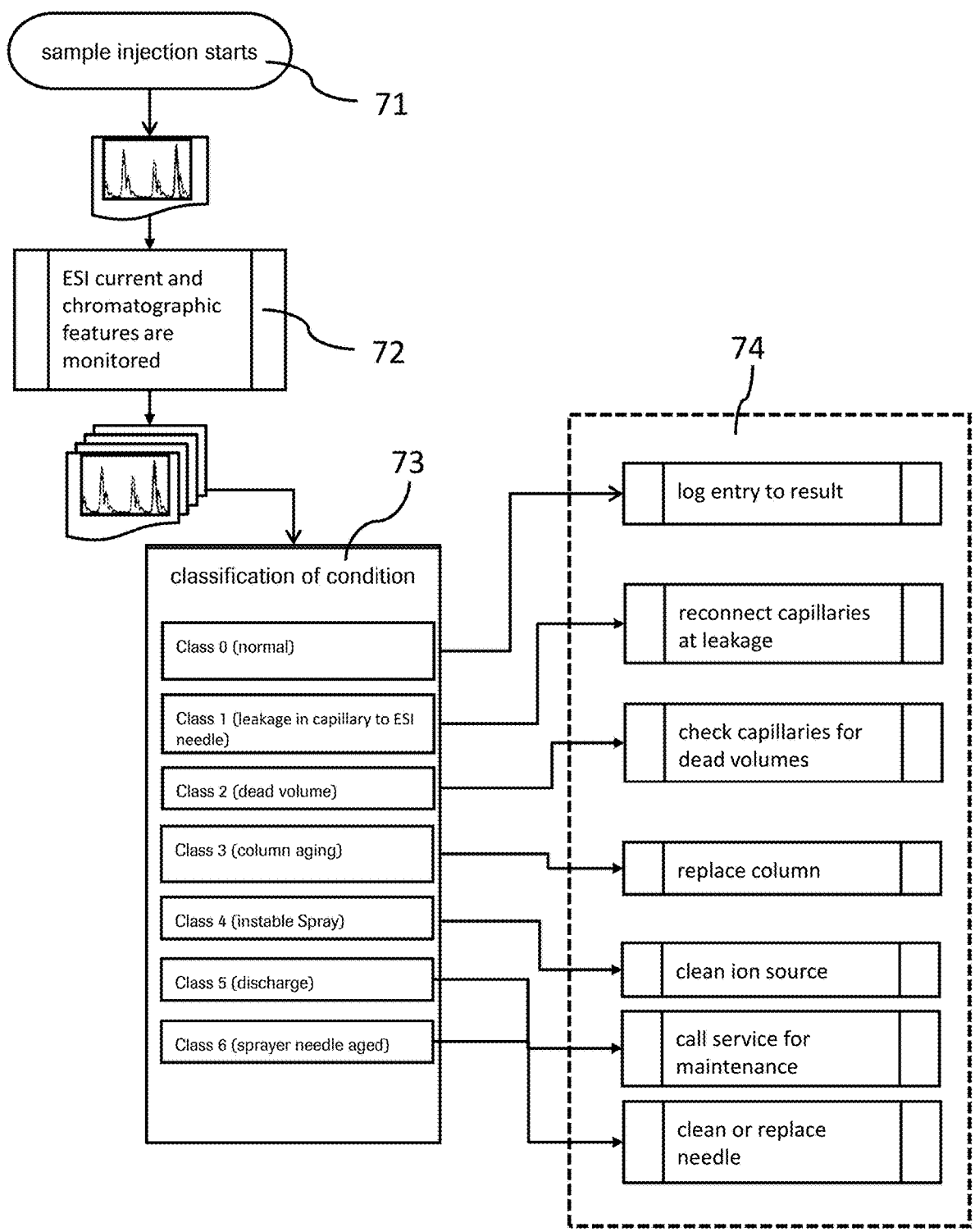
FIG. 6 is a flow diagram of an example monitoring technique including evaluating an ESI current and different further monitored parameters.

FIG. 6 is a flow diagram of an example monitoring technique including evaluating an ESI current and different further monitored parameters.

In a first step, a sample injection starts 71. The ESI current and multiple chromatographic features are monitored 72. Based on the monitored parameters including the ESI current and multiple chromatographic features, a condition of the analyzer is identified 73. In the example of FIG. 6, there are six classes of conditions that can be identified:

A first class relates to a condition in which the analyzer operates normally (i.e., within specification). If the evaluation of the ESI current and multiple chromatographic features yield that the analyzer operates normally, a triggered response can be logging this result.

A second class relates to a condition in which the there is a leakage in a capillary connected to an ESI needle. If the evaluation of the ESI current and multiple chromatographic features yield that second class, a triggered response can be triggering that an operator reconnects capillaries of the LC stream (e.g., by displaying corresponding information on a graphical user display and/or sending a message including the corresponding information).

A third class relates to a presence of a post-column dead volume as discussed above. If the evaluation of the ESI current and multiple chromatographic features yield that third class, a triggered response can be triggering that an operator checks the capillaries for dead volumes (e.g., by displaying corresponding information on a graphical user display and/or sending a message including the corresponding information).

A fourth class relates to a column aging condition of an LC column. If the evaluation of the ESI current and multiple chromatographic features yield that fourth class, a triggered response can be triggering that an operator replaces the respective LC column (e.g., by displaying corresponding information on a graphical user display and/or sending a message including the corresponding information).

A fifth class relates to an instable spray condition of an ESI source. If the evaluation of the ESI current and multiple chromatographic features yield that fifth class, a triggered response can be triggering that an operator cleans an ion source of the ESI source (e.g., by displaying corresponding information on a graphical user display and/or sending a message including the corresponding information).

A sixth class relates to an occurrence of a discharge in an ESI source. If the evaluation of the ESI current and multiple chromatographic features yield that sixth class, a triggered response can be calling an external service to carry out a maintenance operation.

A seventh class relates to aging of a sprayer needle in an ESI source. If the evaluation of the ESI current and multiple chromatographic features yield that seventh class, a triggered response can be triggering that an operator cleans or replaces the sprayer needle (e.g., by displaying corresponding information on a graphical user display and/or sending a message including the corresponding information).

In other examples, a monitoring technique of the present disclosure can include only identifying a sub-set of the classes depicted in FIG. 6 (e.g., only classes 0 to 3).

In addition or alternatively, instead of triggering that an operator performs a particular check or maintenance operation a response can also include triggering an automated check or maintenance operation (e.g., a cleaning of an ion source or a sprayer needle of an ESI source).

Example Condition Logic Table

Figure 7:
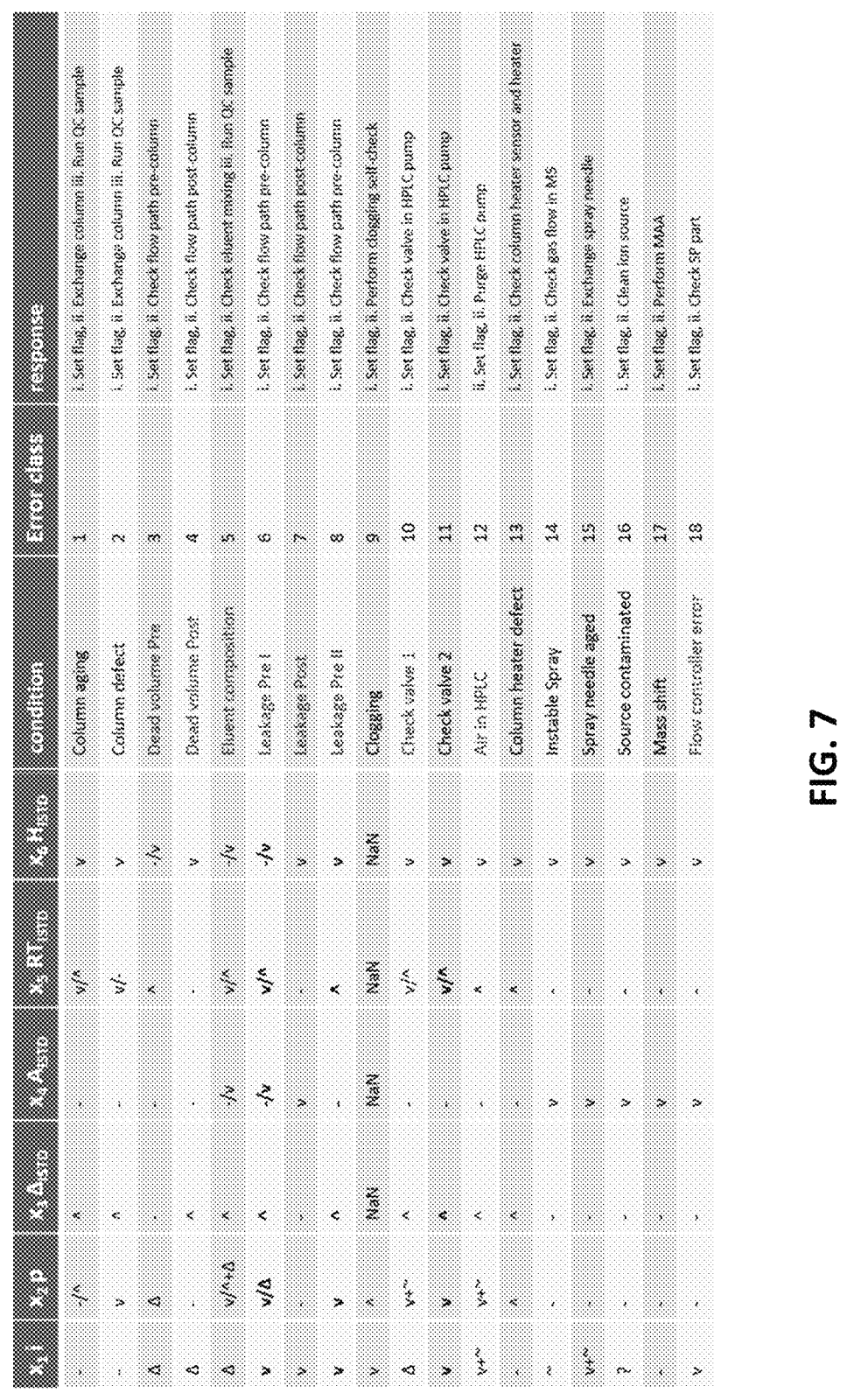

FIG. 7 is a table summarizing how changes in different monitored parameters can be related to different conditions of the analyzer and responses in an example according to the present disclosure.

In the table of FIG. 7, eighteen different error classes are listed with example responses. In the example of FIG. 7, the identification process includes determining whether a particular parameter decreases (v), increases (^), fluctuates or oscillates (~), remains constant (—), or experiences a profile shift (Δ). In each case, the change can be registered only if it is above a predetermined threshold value ("decrease by at least x"). In some examples, two or more of the aforementioned behaviors can be detected in combination (e.g., a parameter can decrease and oscillate at the same time). As can be seen, the example of FIG. 7 uses a relative metric (as discussed above) to compare a monitored parameter or a time series to an earlier measurement of the same parameter or the same time series.

In the example of FIG. 7, seven different parameters are monitored: The ESI current ("$x_1i$"), a LC stream pressure ("$x_2p$"), four chromatographic features including a peak width parameter ("$x_3\Delta$"), a peak area parameter ("$x_4A$"), a retention time parameter ("$x_5RT$"), and a peak height parameter ("$x_6H$"). The chromatographic parameters are determined based on an internal standard for which the expected parameters are known. In other examples, only a subset of these parameters can be used in the identification process.

Now, FIG. 7 specifies a decision logic for identifying a condition of the analyzer. As can be seen in the respective columns each specifying one condition, a behavior of each monitored parameter is assessed. Based on the detected behavior, a condition is identified. For instance, if the ESI current and the peak area are constant, the pressure is constant or increases, the peak area increases, the peak height decrease and the retention time increases or decreases, a column aging condition is identified. A respective response can be triggered including setting a flag, triggering the maintenance operation of changing the respective LC column and running a quality control sample.

As can be seen, in the example of FIG. 7 express rules are defined to identify a particular condition based on behaviors of the monitored parameters. In other examples, no such express rules are defined. For example, a machine learning classifier can receive the monitored parameters (or one or more features extracted from time series of the monitored parameters) and identify a corresponding condition.

Returning to FIG. 7, the table lists eighteen conditions that can be identified based on the above discussed set of parameters. These conditions will be shortly discussed in the subsequent sections.

An LC column defect can be identified if the ESI current remains constant, the monitored pressure remains constant or is increasing, the monitored peak area is increasing, the monitored peak area remains constant, the monitored retention time increases or decreases, the monitored peak height decreases.

A pre-column dead volume can be identified if the ESI current profile shifts, the monitored pressure profile shifts, the monitored peak area and the monitored peak area remain constant, the monitored retention time increases, the monitored peak height remains constant or decreases.

A post-column dead volume can be identified if the ESI current profile shifts, the monitored pressure remains constant, the monitored peak area increases, the monitored peak area and the monitored retention time remain constant, the monitored peak height decreases.

An eluent composition error can be identified if the ESI current profile shifts, the monitored pressure decreases or increases and the profiles shifts, the monitored peak area increases, the monitored peak area remains constant or decreases, the monitored retention time decreases or increases and the monitored peak height decreases or remains constant.

A leakage upstream of an LC column ("leakage pre") can be identified if the ESI current decreases, the monitored pressure remains constant or shows a profile shift, the monitored peak area increases, the monitored peak area decreases or remains constant, the monitored retention time decreases or increases and the monitored peak height decreases or remains constant.

In addition or alternatively, a leakage upstream of an LC column ("leakage pre") can be identified if the ESI current decreases, the monitored pressure increases, the monitored peak area increases, the monitored peak area remains constant, the monitored retention time increases and the monitored peak height decreases.

A leakage downstream of an LC column ("leakage post") can be identified if the ESI current decreases, the monitored pressure remains constant, the monitored peak area remains constant, the monitored peak area decreases, the monitored retention time remains constant and the monitored peak height decreases.

A clogging of the fluid path can be identified if the ESI current decreases and the monitored pressure increases.

A valve error (e.g., in a loading pump of the analyzer) can be identified if the ESI current shows a profile shift, the monitored pressure decreases and oscillates, the monitored peak area increases, the monitored peak area remains constant, the monitored retention time decreases or increases and the monitored peak height decreases.

In addition or alternatively, a valve error (e.g., in a loading pump of the analyzer) can be identified if the ESI current decreases, the monitored pressure decreases, the monitored peak area increases, the monitored peak area remains constant, the monitored retention time decrease or increases and the monitored peak height decreases.

A presence of air in the LC stream can be identified if the ESI current decreases and oscillates, the monitored pressure remains decreases and oscillates, the monitored peak area increases, the monitored peak area remains constant, the monitored retention time increases and the monitored peak height decreases.

An LC column heater error can be identified if the ESI current remains constant, the monitored pressure remains increases, the monitored peak area increases, the monitored peak area remains constant, the monitored retention time increases and the monitored peak height decreases.

An instable ESI spray condition can be identified if the ESI current oscillates, the monitored pressure remains constant, the monitored peak area remains constant, the monitored peak area decreases, the monitored retention time remains constant and the monitored peak height decreases.

An instable ESI spray condition can be identified if the ESI current oscillates, the monitored pressure remains constant, the monitored peak area remains constant, the monitored peak area decreases, the monitored retention time remains constant and the monitored peak height decreases.

An aging of an ESI needle can be identified if the ESI current oscillates and decreases, the monitored pressure remains constant, the monitored peak area remains constant, the monitored peak area decreases, the monitored retention time remains constant and the monitored peak height decreases.

A source contamination condition can be identified if the monitored pressure remains constant, the monitored peak area remains constant, the monitored peak area decreases, the monitored retention time remains constant and the monitored peak height decreases.

A mass shift condition can be identified if the ESI current and the monitored pressure remain constant, the monitored peak area remains constant, the monitored peak area decreases, the monitored retention time remains constant and the monitored peak height decreases.

A flow controller error can be identified if the ESI current decreases, and the monitored pressure remains constant, the monitored peak area remains constant, the monitored peak area decreases, the monitored retention time remains constant and the monitored peak height decreases.

As can be seen, the techniques of the present disclosure can include determining if the ESI current and one or more additional monitored parameters exhibit one of two or more qualitative behaviors (e.g., increase, decrease, remain constant, oscillate or show a profile shift, or a combination of two or more of these behaviors) and identify a condition based on the determined behavior.

Each of the conditions discussed in connection with FIG. 7 or two or more of the conditions in combination (and the particular way of identifying them based on the monitored parameters) can be included in the multiple conditions in addition to the post-column dead volume in examples of the present disclosure. Moreover, as will be discussed below, two or more of the conditions in combination (and the particular way of identifying them based on the monitored parameters) can also be used in a method of monitoring a state of an analyzer not including a dead volume in a liquid chromatography stream of the analyzer downstream of an LC column of the LC stream as one of the identified conditions in some examples.

FIG. 7 also defines particular responses which can be triggered when the respective conditions is detected. The responses have been explained in detail above and will not be repeated for the sake of brevity.

Alternative Condition Identification Technique

In the preceding sections, techniques according to the present disclosure have been discussed in which one of the identified conditions is a presence of a dead volume in a liquid chromatography stream of the analyzer downstream of an LC column of the LC stream. However, the present disclosure also covers other examples where other conditions of a component of the analyzer than a post-column dead volume are detected (and possibly a post-volume dead column is not one of the detected conditions).

In general, an automated method of monitoring a state of an analyzer including a mass spectrometer (MS) with an electrospray ionization source can include monitoring an electrospray ionization current of the ESI source and identifying a condition of a component of the analyzer based on the monitored ionization current of the ESI source.

The method can use any of the techniques discussed above and below in the context of a monitoring technique necessarily including that one of the identified conditions is a post-column dead volume, as long as the particular aspect is not specific for post-column dead volume detection.

For instance, the conditions can include one or more of an aging of a particular component of the analyzer or an error or defect of a particular component of the analyzer. In some examples, the multiple conditions can include one or more of a presence of a pre-column dead volume, a valve error, a spray needle aging, a column defect, a column aging, an instable spray, a clogging, a leakage, and an ion source contamination. In other examples, the conditions can include one of the conditions discussed in connection with FIG. 7 above.

In some examples, the automated method can include monitoring one or more additional parameters including a pressure in a liquid chromatography (LC) stream of the analyzer (e.g., one or more chromatographic features of a chromatogram of a liquid chromatography (LC) stream of the analyzer and/or a pressure in a liquid chromatography (LC) stream of the analyzer), the identification of a condition being further based on the monitored additional parameters to distinguish the multiple conditions.

Computer-Implementation

The present disclosure also relates to a computer system being configured to carry out the techniques of a state of an analyzer including a mass spectrometer (MS) with an electrospray ionization source coupled to a liquid chromatography (LC) stream.

In some examples, the computer system can be a controller of the analyzer (or part thereof). However, in other examples, the computer system can be only connected to the analyzer through a network and not be part of the controller of the analyzer. For instance, the computer system can be a hospital or laboratory management system, or a computer system of a vendor or service provider of the analyzers.

It is merely required that the computer system obtains the time series of system pressures of an injection assembly of the liquid chromatography stream. This can mean that the computing system receives this information over a network. However, in other examples, as discussed above, the computing system also controls functions of the analyzer (e.g., measuring pressures or triggering responses) which means that it is the controller of the analyzer.

The computing systems of the present disclosure are not limited to a particular software or hardware configuration. As long as a software or hardware configuration is capable of carrying out the steps of the techniques for monitoring a state of an analyzer including a mass spectrometer (MS) with an electrospray ionization source coupled to a liquid chromatography (LC) stream according to the present disclosure the computing system can have this software or hardware configuration.

The present disclosure also relates to a computer-readable medium having instructions stored thereon which when carried out by a computer system prompt the computer system to carry out the steps of the techniques for monitoring a state of an analyzer including a mass spectrometer (MS) with an electrospray ionization source coupled to a liquid chromatography (LC) stream according to the present disclosure.

Further disclosed and proposed is a computer program including computer-executable instructions for performing the method according to the present disclosure in one or more of the embodiments enclosed herein when the program is executed on a computer or computer network. Specifically, the computer program may be stored on a computer-readable data carrier. Thus, specifically, one, more than one or even all of method steps as disclosed herein may be performed by using a computer or a computer network, typically by using a computer program.

Further disclosed and proposed is a computer program product having program code, in order to perform the method according to the present disclosure in one or more of the embodiments enclosed herein when the program is executed on a computer or computer network. Specifically, the program code may be stored on a computer-readable data carrier.

Further disclosed and proposed is a data carrier having a data structure stored thereon, which, after loading into a computer or computer network, such as into a working memory or main memory of the computer or computer network, may execute the method according to one or more of the embodiments disclosed herein.

Further disclosed and proposed is a computer program product with program code stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Further disclosed and proposed is a modulated data signal which contains instructions readable by a computer system or computer network, for performing the method according to one or more of the embodiments disclosed herein.

Referring to the computer-implemented aspects of the present disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing measurements.

Further disclosed and proposed is a computer, or computer network, comprising at least one processor, wherein the processor is adapted to perform the method according to one of the embodiments described in this description.

Further disclosed and proposed is a computer loadable data structure that is adapted to perform the method according to one of the embodiments described in this description while the data structure is being executed on a computer.

Further disclosed and proposed is a storage medium, wherein a data structure is stored on the storage medium and wherein the data structure is adapted to perform the method according to one of the embodiments described in this description after having been loaded into a main and/or working storage of a computer or of a computer network.

Further Aspects

A number of aspects of the techniques for monitoring a state of an analyzer including a mass spectrometer (MS) with an electrospray ionization source coupled to a liquid chromatography (LC) stream of the present disclosure have been discussed in the preceding sections. In addition, the techniques for monitoring a state of an analyzer including a mass spectrometer (MS) with an electrospray ionization source coupled to a liquid chromatography (LC) stream of the present disclosure can also be carried out according to the following embodiments. Summarizing the findings of the present disclosure, the following embodiments are typical:

Embodiment 1. An automated method of monitoring a state of an analyzer including a mass spectrometer (MS) with an electrospray ionization (ESI) source coupled to a liquid chromatography (LC) stream, the method comprising:
  monitoring an electrospray ionization current of the ESI source; and
  identifying a condition of multiple conditions of the analyzer based on the monitored ionization current of the ESI source,
  wherein one of the conditions is a presence of a dead volume in a liquid chromatography stream of the analyzer downstream of an LC column of the LC stream.

Embodiment 2. An automated method of monitoring a state of an analyzer including a mass spectrometer (MS) with an electrospray ionization (ESI) source, the method comprising:
  monitoring an electrospray ionization current of the ESI source; and
  identifying a condition of a component of the analyzer based on the monitored ionization current of the ESI source.

Embodiment 3. The method of embodiment 1 or embodiment 2, further comprising monitoring one or more additional parameters including a pressure in a liquid chromatography (LC) stream of the analyzer, wherein the identification of a condition is further based on the monitored additional parameters to distinguish the multiple conditions.

Embodiment 4. The method of any one of embodiments 1 to 3, further comprising monitoring one or more additional parameters including one or more chromatographic features of a chromatogram of a liquid chromatography (LC) stream of the analyzer, wherein the identification of a condition is further based on the monitored additional parameters to distinguish the multiple conditions.

Embodiment 5. The method of embodiment 4, wherein the chromatographic feature is selected from the list consisting of a peak width parameter, a retention time parameter, a peak height parameter, a peak area parameter, and a peak symmetry parameter.

Embodiment 6. The method of any one of embodiments 1 to 5, wherein the conditions include one or more of an aging of a particular component of the analyzer or an error or defect of a particular component of the analyzer.

Embodiment 7. The method of any one of embodiments 1 to 6, wherein the multiple conditions further include one or more of:
- a presence of a pre-column dead volume;
- a valve error;
- a spray needle aging;
- a column defect;
- a column aging;
- an instable spray;
- a clogging;
- a leakage;
- an ion source contamination.

Embodiment 8. The method of any one of embodiments 1 to 7, wherein the identification of a condition of multiple conditions includes determining one or more of a decrease in a monitored parameter, an increase of a monitored parameter, a fluctuation of a monitored parameter, a shift in a time series of the monitored parameter, and a profile change of a time series of the monitored parameter.

Embodiment 9. The method of embodiment 8, wherein identifying a presence of a dead volume in a liquid chromatography stream based on the monitored ionization current of the ESI source includes assessing a profile shift in a time series of the monitored ionization current of the ESI source.

Embodiment 10. The method of embodiment 9, wherein a presence of a dead volume in a liquid chromatography stream is identified if the profile shift in a time series of the monitored ionization current of the ESI source is above a certain predetermined threshold profile shift.

Embodiment 11. The method of any one of embodiments 2 to 10, wherein the additional measured parameters are measured on an internal standard.

Embodiment 12. The method of any one of the preceding embodiments 1 to 11, further comprising:
- triggering one or more selected responses of multiple responses depending on the determined condition of the analyzer.

Embodiment 13. The method of embodiment 12, wherein the multiple responses include a response including logging the determined condition of the analyzer.

Embodiment 14. The method of embodiment 12 or embodiment 13, wherein the multiple responses include a response including starting or scheduling an automatic maintenance operation.

Embodiment 15. The method of any one of embodiments 12 to 14, wherein the multiple responses include generating an error message.

Embodiment 16. The method of any one of embodiments 12 to 15, wherein the multiple responses include asking an operator to perform a predetermined maintenance operation.

Embodiment 17. The method of any one of embodiments 12 to 16, wherein the multiple responses include informing a service provider.

Embodiment 18. The method of any one of embodiments 12 to 17, wherein the multiple responses include scheduling a preventive maintenance operation.

Embodiment 19. The method of any one of embodiments 14, 16 or 18, wherein the maintenance operation is one of reconnecting a capillary of the ESI source, replacing a column of an LC stream of the analyzer, cleaning an ion source of the ESI source, and cleaning or replacing a capillary of the ESI source.

Embodiment 20. The method of any one of embodiments 1 to 19, wherein determining a condition of the analyzer includes identifying an error of the analyzer, optionally one error of multiple predetermined errors.

Embodiment 21. The method of any one of embodiments 1 to 20, wherein identifying a presence of a dead volume in a liquid chromatography stream of the analyzer downstream of an LC column of the LC stream includes determining if a waveform of the electrospray ionization current has a phase shift compared to a reference waveform.

Embodiment 22. The method of any one of embodiments 20 to 21, wherein the error is an error in a capillary leading to a sprayer needle of the ESI source, optionally a leakage in the capillary.

Embodiment 23. The method of any one of embodiments 20 to 22, wherein the error is an instable spray of a sprayer needle of the ESI source.

Embodiment 24. The method of any one of embodiments 20 to 23, wherein the error is caused by a column aging of an LC column.

Embodiment 25. The method of any one of embodiments 20 to 24, wherein the error is caused by an aging of an ESI sprayer of the ESI source.

Embodiment 26. The method of any one of embodiments 1 to 25, wherein determining a condition of the analyzer includes determining if the electro spray ionization current of the ESI source and optionally one or more additional measured parameters of the analyzer are within or outside a respective acceptance range.

Embodiment 27. The method of embodiment 26, wherein the one or more acceptance ranges are defined based on reference data for the respective parameters.

Embodiment 28. The method of embodiment 26 or embodiment 27, wherein an error of multiple potential errors is identified based determining if the electrospray ionization current of the ESI source and optionally one or more additional measured parameters of the analyzer are within or outside an acceptance range.

Embodiment 29. The method of any one of embodiments 1 to 28, wherein determining a condition of the analyzer based on the electrospray ionization current and optionally one or more additional measured parameters of the analyzer includes using a classifier identifying one of multiple error classes.

Embodiment 30. The method of embodiment 29, wherein the classifier is a classifier trained by a machine learning algorithm.

Embodiment 31. The method of any one of embodiments 1 to 30, further including predicting a development of the electrospray ionization current and optionally one or more additional measured parameters over time based on the monitored electrospray ionization current and optionally one or more additional measured parameters.

Embodiment 32. The method of embodiment 31, further comprising:

triggering a response based on the predicted development of the electrospray ionization current and optionally one or more additional measured parameters.

Embodiment 33. The method of any of the preceding embodiments 1 to 32, wherein the electrospray ionization current is a current flowing between a spray needle and a counter electrode.

Embodiment 34. A computer system being configured to carry out the steps of any one of the methods of embodiments 1 to 33.

Embodiment 35. The computer system of embodiment 34, wherein the computer system is a controller of the analyzer.

Embodiment 36. A computer-readable medium having instructions stored thereon which when executed by a computer system prompt the computer system to carry out the steps of any one of the methods of embodiments 1 to 33.

What is claimed is:

1. An automated method of monitoring a state of an analyzer including a mass spectrometer (MS) with an electrospray ionization (ESI) source coupled to a liquid chromatography (LC) stream, the method comprising:
    monitoring an electrospray ionization current of the ESI source; and
    identifying a condition of multiple conditions of the analyzer based on the monitored ionization current of the ESI source, wherein one of the conditions is a presence of a dead volume in a liquid chromatography stream of the analyzer downstream of an LC column of the LC stream.

2. The method of claim 1, further comprising monitoring one or more additional parameters including a pressure in a liquid chromatography (LC) stream of the analyzer, wherein the identification of a condition is further based on the monitored additional parameters to distinguish the multiple conditions.

3. The method of claim 2, wherein the additional measured parameters are measured on an internal standard.

4. The method of claim 1, further comprising monitoring one or more additional parameters including one or more chromatographic features of a chromatogram of a liquid chromatography (LC) stream of the analyzer, wherein the identification of a condition is further based on the monitored additional parameters to distinguish the multiple conditions.

5. The method of claim 4, wherein the chromatographic feature is selected from the list consisting of a peak width parameter, a retention time parameter, a peak height parameter, a peak area parameter, and a peak symmetry parameter.

6. The method of claim 1, wherein the conditions include one or more of an aging of a particular component of the analyzer or an error or defect of a particular component of the analyzer.

7. The method of claim 1, wherein the multiple conditions further include one or more of a presence of a pre-column dead volume (15); a valve error; a spray needle aging; a column defect; a column aging; an instable spray; a clogging; a leakage; or an ion source contamination.

8. The method of claim 1, wherein the identification of a condition of multiple conditions includes determining one or more of a decrease in a monitored parameter, an increase of a monitored parameter, a fluctuation of a monitored parameter, a profile shift in a time series of the monitored parameter, and a profile change of a time series of the monitored parameter.

9. The method of claim 8, wherein identifying a presence of a dead volume in a liquid chromatography stream based on the monitored ionization current of the ESI source includes assessing a profile shift in a time series of the monitored ionization current of the ESI source.

10. The method of claim 1, further comprising triggering one or more selected responses of multiple responses depending on the determined condition of the analyzer.

11. The method of claim 10, wherein the multiple responses include one or more of logging the determined state of the analyzer; starting or scheduling an automatic maintenance operation; generating an error message; asking an operator to perform a predetermined maintenance operation; informing a service provider; or scheduling a preventive maintenance operation.

12. The method of claim 11, wherein the maintenance operation is one of reconnecting a capillary of the ESI source; replacing an LC column of an LC stream of the analyzer; cleaning an ion source of the ESI source; or cleaning or replacing a capillary of the ESI source.

13. The method of claim 1, further including predicting a development of the electrospray ionization current and optionally one or more additional measured parameters over time based on the monitored electrospray ionization current and optionally one or more additional measured parameters, and triggering a response based on the predicted development of the electrospray ionization current and optionally one or more additional measured parameters.

14. A computer system being configured to carry out the steps of the method of claim 1.

15. A computer-readable medium having instructions stored thereon that when executed by a computer system prompt the computer system to carry out the steps of the method of claim 1.

* * * * *